US008136892B2

(12) United States Patent
Lacroix et al.

(10) Patent No.: US 8,136,892 B2
(45) Date of Patent: Mar. 20, 2012

(54) METHOD AND BOOSTER WHICH ARE INTENDED TO DETECT THE BRAKING OF A VEHICLE, AND METHOD OF PRODUCING SUCH A BOOSTER

(75) Inventors: Stephane Lacroix, Tournan en Brie (FR); Philippe Richard, Chelles (FR); Jean Fourcade, Champs sur Marne (FR); Olivier Castello, Esbly (FR)

(73) Assignee: Robert Bosch GmbH, Stuttgart (DE)

( * ) Notice: Subject to any disclaimer, the term of this patent is extended or adjusted under 35 U.S.C. 154(b) by 1037 days.

(21) Appl. No.: 12/050,564

(22) Filed: Mar. 18, 2008

(65) Prior Publication Data
US 2008/0230328 A1 Sep. 25, 2008

(30) Foreign Application Priority Data
Mar. 22, 2007 (FR) ...................................... 07 02099

(51) Int. Cl.
*B60T 8/34* (2006.01)
(52) U.S. Cl. .................... 303/113.4; 188/1.11 E; 60/328
(58) Field of Classification Search ............... 303/113.4; 60/328; 188/1.11 E
See application file for complete search history.

(56) References Cited

U.S. PATENT DOCUMENTS

| | | | | |
|---|---|---|---|---|
| 4,086,533 A * | 4/1978 | Ricouard et al. | ........... | 324/207.2 |
| 4,204,158 A * | 5/1980 | Ricouard et al. | ........... | 324/207.2 |
| 4,665,362 A * | 5/1987 | Abel et al. | ............... | 324/207.2 |
| 5,477,675 A * | 12/1995 | Ingraham et al. | ............... | 60/418 |
| 5,841,273 A * | 11/1998 | Muraji | ...................... | 324/207.17 |
| 6,304,078 B1 * | 10/2001 | Jarrard et al. | ............... | 324/207.2 |
| 6,352,316 B1 * | 3/2002 | Oka et al. | .................... | 303/114.3 |
| 6,513,416 B2 * | 2/2003 | Oka et al. | ......................... | 91/371 |
| 6,619,039 B2 * | 9/2003 | Zehnder et al. | ................. | 60/534 |
| 6,652,039 B1 * | 11/2003 | Shull et al. | ................. | 303/113.2 |
| 7,018,002 B2 * | 3/2006 | Masson et al. | ............. | 303/113.4 |
| 2001/0011498 A1 * | 8/2001 | Oka et al. | ......................... | 91/371 |
| 2004/0164611 A1 * | 8/2004 | Masson et al. | ............. | 303/113.4 |
| 2004/0263155 A1 * | 12/2004 | Schroeder et al. | ........ | 324/207.12 |
| 2005/0000772 A1 * | 1/2005 | Wohner | ..................... | 192/30 W |

FOREIGN PATENT DOCUMENTS

| | | |
|---|---|---|
| DE | 10133163 A1 | 8/2002 |
| WO | 02/066307 A2 | 8/2002 |

OTHER PUBLICATIONS

FR0702099 Search Report and Written Opinion, Nov. 29, 2007.

\* cited by examiner

*Primary Examiner* — Robert Siconolfi
*Assistant Examiner* — James Hsiao
(74) *Attorney, Agent, or Firm* — Michael Best & Friedrich LLP

(57) ABSTRACT

A method of detecting the braking of a vehicle comprising a push rod (200) intended to transmit an amplified braking command to a master cylinder. A plunger (220), arranged parallel to the primary piston (200) so as to reproduce the movements of this piston, and a sensor (230) which senses the movements of the plunger (220), this sensor (230) being fastened to the booster (250), are used to detect a braking operation by detecting a movement of the plunger (220).

20 Claims, 5 Drawing Sheets

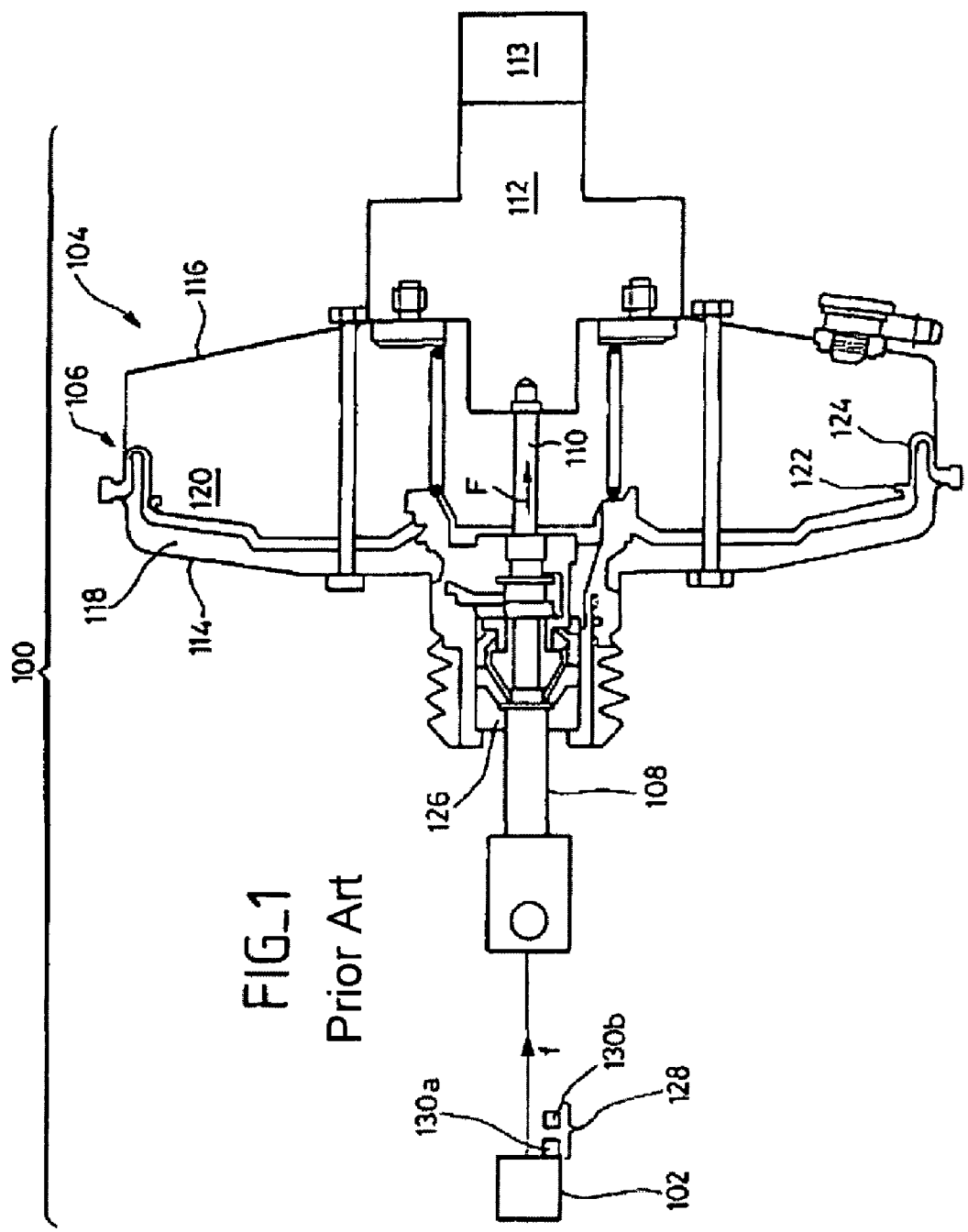
FIG_1
Prior Art

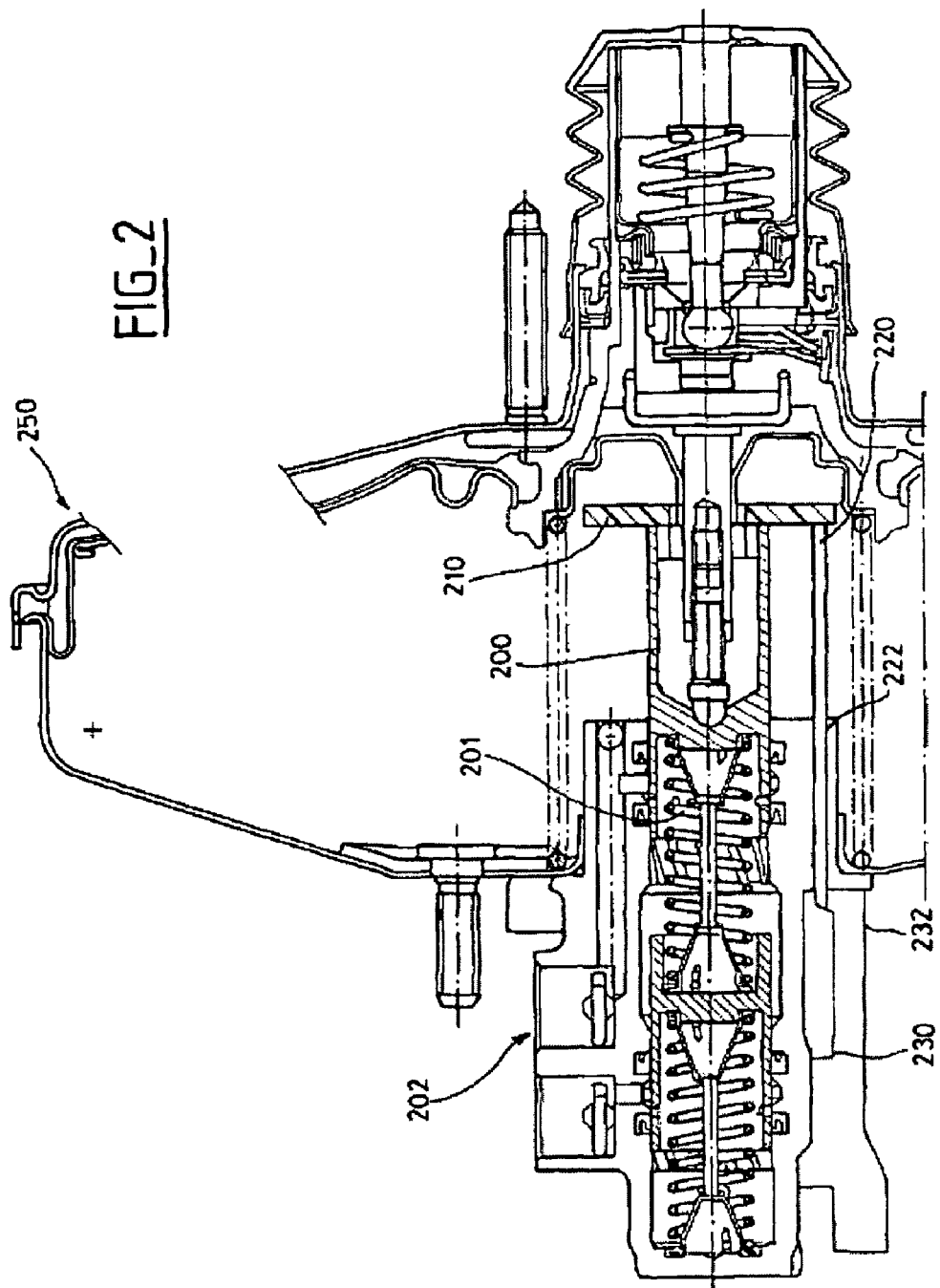
FIG_2

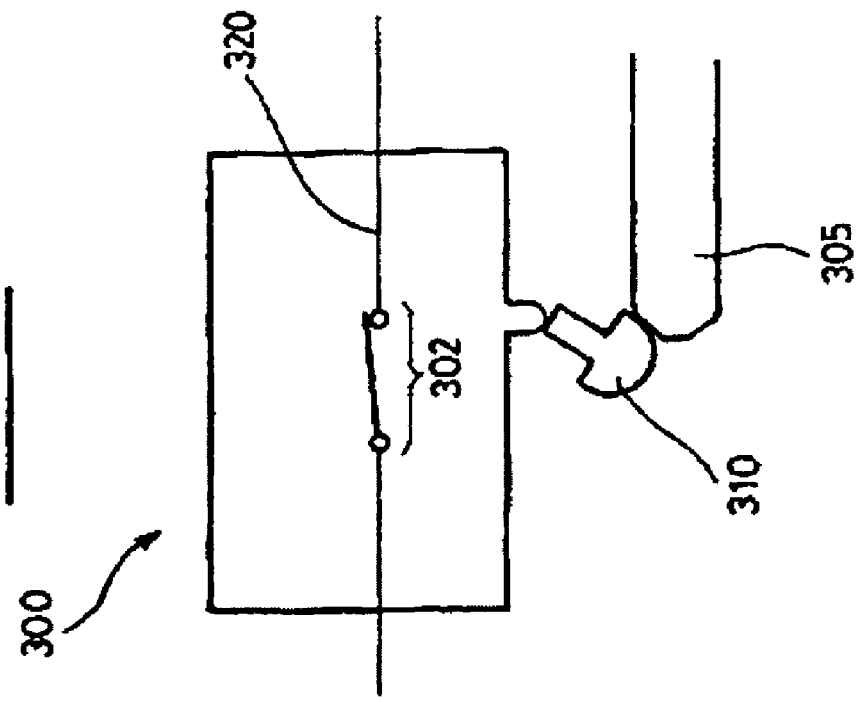
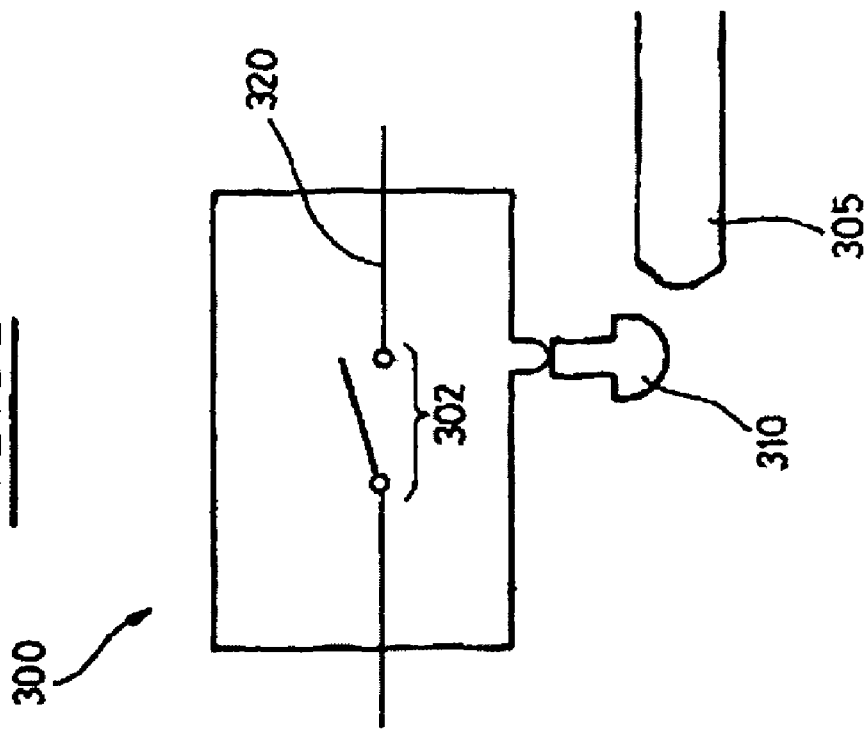

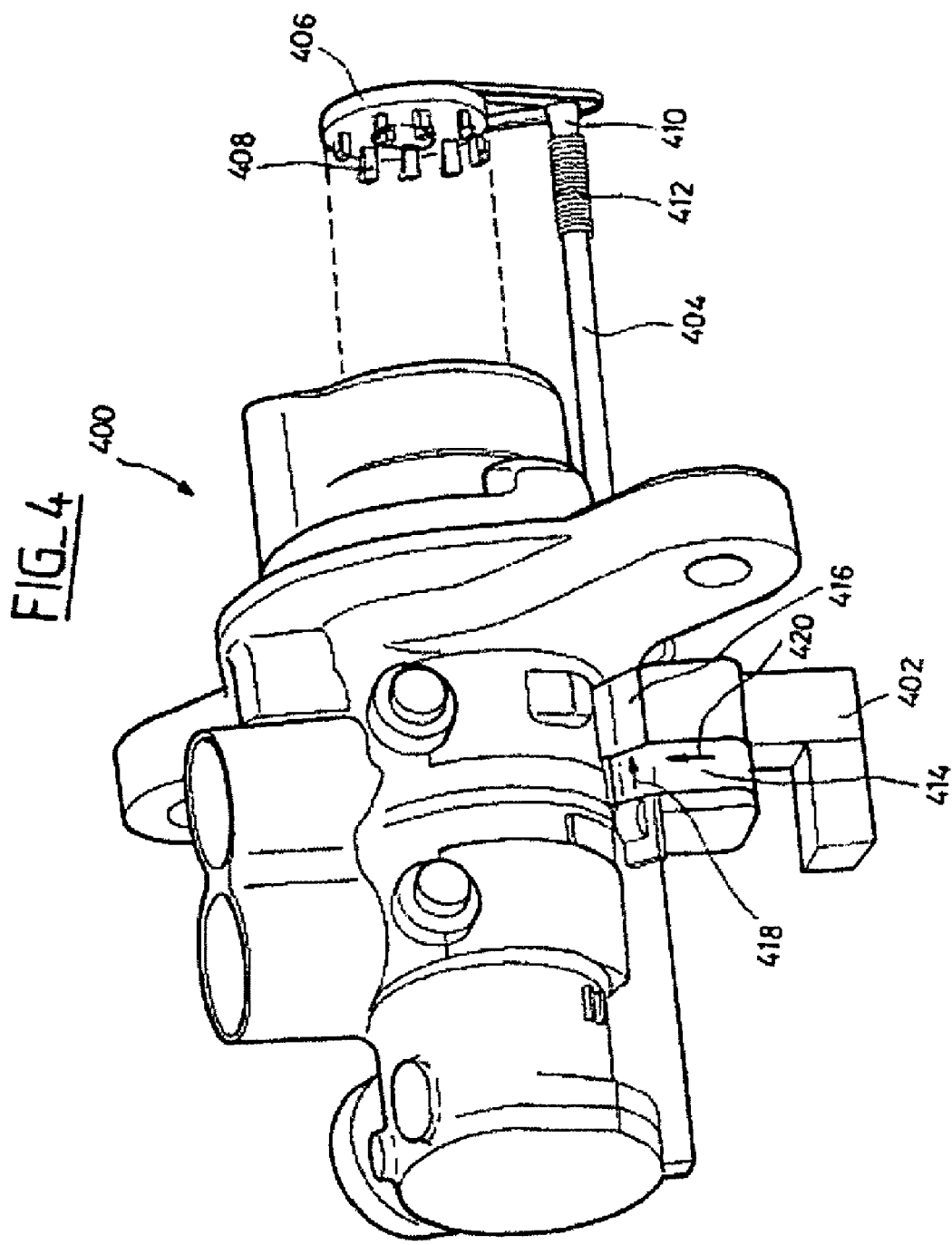

METHOD AND BOOSTER WHICH ARE INTENDED TO DETECT THE BRAKING OF A VEHICLE, AND METHOD OF PRODUCING SUCH A BOOSTER

BACKGROUND OF THE INVENTION

The present invention relates to a method and to a booster which are intended to detect the braking of a vehicle, and also to a method of producing such a booster.

A vehicle braking device 100 (FIG. 1) is generally operated by a driver using a brake pedal 102 intended to transmit the command force f exerted on this pedal 102 to a braking system 113 comprising, for example, a caliper equipped with a piston and with brake pads which are intended to clamp a disk secured to a braked wheel.

To amplify the force f exerted by this driver into a force F transmitted to the braking system, it is known practice to use a pneumatic brake booster 104.

To that end, this booster 104 comprises a casing 106 cooperating with a control rod 108, connected to the brake pedal 102, and with a push rod 110 connected to a master cylinder 112 connected to the braking system 113, such that when the control rod 108 is moved by means of an action f transmitted by the brake pedal 102, the booster 104 moves the rod 110 with a thrust F whose intensity is greater than the intensity of the command f.

To achieve this, the casing 106 comprises a cover 114 and a cylinder 116 cooperating with this cover 114 in a sealed manner, the internal volume of the casing 106 then being divided into a first chamber 118, termed rear chamber, and into a second chamber 120, termed front chamber, by means of a rigid skirt 122 and a flexible diaphragm 124 which provide sealing between these two chambers 118 and 120.

In a first instance, when the booster 104 is inactive, that is to say when no braking action is applied by the driver of the vehicle, the pressure in the rear 118 and front 120 chambers is kept below the atmospheric pressure by means of a pumping device (not shown).

In a second instance, when the driver of the vehicle presses on the brake pedal 102, the control rod 108 moves under the action of the command f and activates a pneumatic mechanism 126 such that air at atmospheric pressure enters the rear chamber 118.

Since the pressure in the rear chamber 118 is higher than the pressure in the front chamber 120, the diaphragm 124 and the skirt 122 are subjected to a thrust F whose intensity is equal to $\Delta P \times S$, where $\Delta P$ is the difference in pressure between the two chambers and S is the area of the diaphragm.

The movement of the skirt 122, and of the associated rod 110, thus transmits a thrust F to the master cylinder 112 associated with the braking system.

Moreover, the detection of a braking action is an essential operation in a vehicle, for example in order to generate a signal intended to illuminate brake lights at the rear of the vehicle, thus indicating the start of braking to other vehicles, or in order to activate various electronic systems associated with braking, such as the antilock system (ABS).

Such a detection currently uses a sensor 128 which senses the movement of the brake pedal 102, this sensor comprising a first fixed connector 130*a* and a second movable connector 130*b* which can move on the pedal such that this second connector comes into contact with the first, closing an electric circuit, when the driver presses on the brake pedal 102.

SUMMARY OF THE INVENTION

The present invention results from the observation of various problems arising from the braking detection method according to the prior art.

A first problem lies in the fact that the currently used sensor 128 is a mechanical contact sensor which thus has a significant degree of wear and hence carries a risk of failure which increases with time.

A second problem stems from the fact that, when the vehicle is being manufactured, the sensor 128, its connectors 130*a* and 130*b* and the cables (not shown) associated with these elements require a specific mounting below the brake pedal 102, this being costly in terms of the production time needed to mount these various elements.

Furthermore, these mounting operations, and the subsequent adjustments of these elements, are particularly laborious and difficult for the individuals undertaking this work given the position of the brake pedal, which is situated in a restricted and not easily accessible space at the bottom of the vehicle cabin.

The invention solves at least one of these problems. It relates to a method of detecting the braking of a vehicle provided with a booster comprising a push rod intended to transmit an amplified braking command to a master cylinder, characterized in that a plunger, arranged parallel to the push rod so as to reproduce the movements of this push rod, and a sensor which senses the movements of the plunger, this sensor being fastened to the booster, are used to detect a braking operation by detecting a movement of the plunger.

By virtue of the invention, the device for detecting vehicle braking is integrated with the booster such that this function no longer requires any specific mounting and adjustments on the vehicle assembly line, thus reducing the cost of mounting this detection device in the vehicle.

The invention allows the use of contactless sensors which no longer give rise to mechanical wear, with the result that the life of the detector is increased and its reliability is improved.

Moreover, it is possible to alleviate the problem of interoperability between the various systems in the event of subsequent failures or changes by incorporating the braking detection device in the booster, since the distribution of components between the cabin and the engine no longer demands the use of a given type of device.

Finally, it is also possible to dispense with the particularly laborious work on the assembly line relating to the position of the detection device, which is no longer situated in a difficult-to-access space in the driver's cabin.

In one embodiment, the plunger slides in a housing of the master cylinder.

In one embodiment, the plunger is secured to the plate by way of a spring having contiguous turns which makes it possible to correct the coaxiality deviations associated with the construction of the assembly.

In one embodiment, the sensor uses a reed switch sensitive to a magnetic field which varies according to the movement of the plunger.

According to one embodiment, the sensor uses the Hall effect to detect a movement of the plunger.

In one embodiment, the plunger generates a magnetic field in its end close to the sensor, this sensor being sensitive to the magnetic field of the plunger.

According to one embodiment, the sensor is a contactor-type sensor comprising a movable control of a switch, the plunger coming into contact with the control when the plunger moves.

In one embodiment, the sensor is situated in a casing arranged on the master cylinder.

According to one embodiment, the casing is sealed.

In one embodiment, the casing is positioned with respect to the master cylinder by means of at least one rail of the master cylinder and a stop on this rail, the rail and the stop providing play-free axial positioning.

According to one embodiment, the casing is fastened to the rail by means of a spring clip enclosing the casing.

The invention also relates to a pneumatic brake booster for a vehicle, this booster comprising a push rod intended to transmit an amplified braking command to a master cylinder.

According to this invention, such a booster is characterized in that it comprises a plunger, arranged parallel to the push rod so as to reproduce the movements of this push rod, and a sensor which senses the movements of the plunger, this sensor being arranged on the booster and detecting a braking operation from the detection of a movement of the plunger using a method according to one of the preceding embodiments.

BRIEF DESCRIPTION OF THE DRAWINGS

Other features and advantages of the invention will become apparent from the description given below by way of nonlimiting example and with reference to the appended figures, in which:

FIG. 1, already described above, is a diagram showing the operation of a known braking device, FIG. 2 represents a schematic axial section through a booster according to the invention, and FIGS. 3a and 3b represent one embodiment of a mechanical sensor employed in the booster described in FIG. 2, and FIG. 4 represents a three-dimensional view of one embodiment of the arrangement of a casing 402, containing a sensor (not shown), of a plunger 404 and of a plate 406 (equivalent to the plate 210 shown in FIG. 2) on a master cylinder 400. The plate 406 is made of plastic. It comprises spring tabs 408 which allow it to be snap-fastened into the groove of the primary piston.

DETAILED DESCRIPTION

Figure 5A:
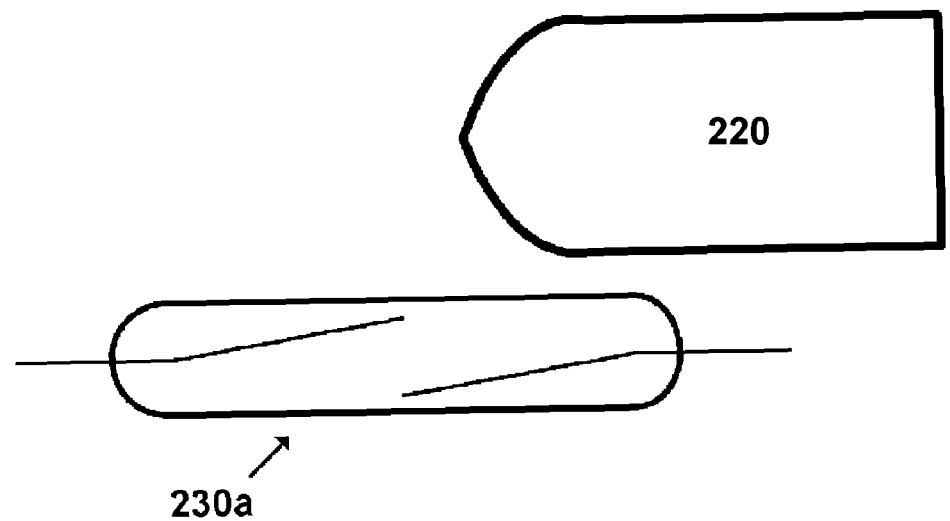
FIG. 5a is a schematic representation of a sensor such as a reed switch.
Figure 5B:
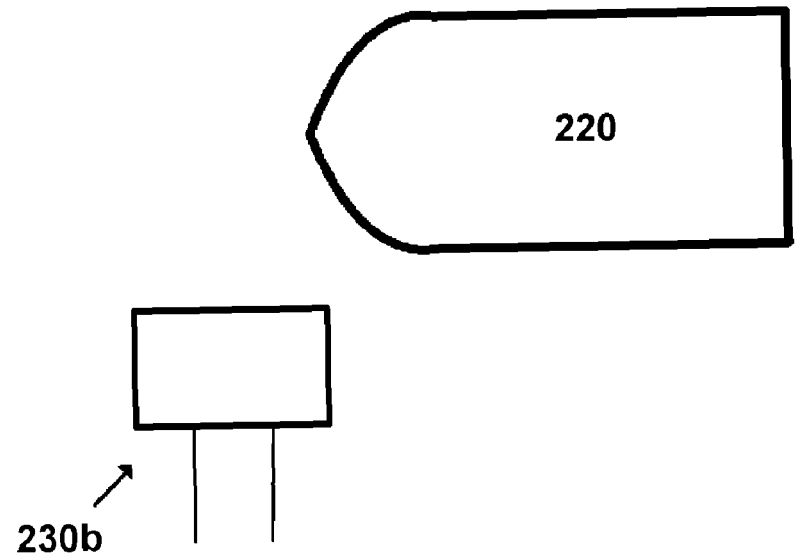
FIG. 5b is a schematic representation of a sensor such as a Hall effect sensor.

FIG. 2 shows a booster 250 according to the invention, that is to say comprising a plunger 220 associated with the movement of the push rod 200 of the booster, this rod 200 being analogous to the push rod 110 described in FIG. 1.

According to the invention, the method of detecting the braking of a vehicle provided with a master cylinder 202, 400 and with a primary piston 200 is characterized in that a plunger 220, 305, 404, arranged parallel to the primary piston 200 so as to reproduce the movements of the primary piston 200, and a sensor 230, 300 which senses the movement of the plunger 220, 305, 404 are used to detect a braking operation.

For this purpose, the piston 200 is provided with a plate 210, for example a plastic plate, which allows the plunger 220 to be arranged parallel to the piston 200.

In addition, the plunger 220 is kept parallel to the piston 200 by virtue of a housing 222 of the master cylinder which provides vacuum sealing between the plunger 220 and the housing 222 in which the plunger 220 slides.

Moreover, a sensor 230 which senses the movements of the plunger 220 is integrated into a casing 232 associated with the master cylinder 202 of the booster such that the plunger 222 slides in this casing 232, in the vicinity of the detector 230, during its movements.

The sensor 230 integrated into the casing 232 can be a reed switch 230a comprising two mutually opposite flexible metal blades which are sensitive to a magnetic field and form a detection circuit.

More precisely, these metal blades are such that, depending on whether they are in the presence or in the absence of a magnetic field, they come into contact, closing the detection circuit, or they remain distant from one another, opening the detection circuit.

Thus, considering that the plunger 220 is magnetized at its end sliding in the vicinity of the detector 230, what occurs is that, depending on the position of the end of the plunger with respect to the blades, these blades are either in contact when the plunger 220 approaches or distant when the plunger 220 moves away.

In other words, a variable current is obtained at the outlet of the reed sensor 230a according to the position of the plunger 220, that is to say according to the position of the piston 200 and, therefore, according to the braking command.

In another embodiment, the casing 232 comprises a contactor-type mechanical sensor, also known as a microswitch, which is described in detail below with the aid of FIGS. 3a and 3b.

More precisely, such a sensor 300 has been shown at rest in FIG. 3a, that is to say when no braking action is commanded.

It is apparent that this sensor 300 comprises an electric circuit 320 along with a switch 302 which, when the plunger 305 is kept distant, keeps the circuit open such that no current can flow through the circuit 320.

Conversely, when a braking action is commanded (FIG. 3b), the end 305 of the plunger comes into contact with a control 310 of the switch 302, which then closes the circuit 320, allowing current to flow in this circuit.

Thus, the current which passes through the circuit 320 is used in this embodiment as a readily detectable braking signal, this current being zero when no braking action is commanded and nonzero when such a braking action is performed.

However, it should be pointed out that this arrangement can be easily exchanged so as to have a nonzero current at rest and a zero current when braking.

In a third embodiment, the sensor 230 integrated into the casing 232 uses the Hall effect (e.g. a Hall effect sensor 230b) to detect the movement of the plunger, this plunger being magnetized as in the first embodiment.

It should be noted that the casing has to be particularly resistant to the harsh conditions of the engine compartment, namely the high temperature and the requirement for a high level of sealing, for example with respect to a powerful jet of cleaning liquid.

Consequently, in one embodiment, this casing is made of nylon 66, comprising 30% glass, a material known for its heat resistance and sealing properties.

Moreover, the plunger is made of rigid plastic.

FIG. 4 represents a three-dimensional view of one embodiment of the arrangement of a casing 402, containing a sensor (not shown), of a plunger 404 and of a plate 406 (equivalent to the plate 210 shown in FIG. 2) on a master cylinder 400. The plate 406 is made of plastic. It comprises spring tabs 408 which allow it to be snap-fastened into the groove of the primary piston.

The plunger 404 is connected to the plate 406, at a conical projection 410 of the plate 406, by way of a helical spring 412 having contiguous turns. The diameter of the spring 412 is slightly less than the diameter of the projection 410 of the plate on which it is screwed by force or is fitted.

This spring 412 performs two functions:

regulating the travel of the plunger 404: since the travel of the plunger 404 needs to be adjusted so as to correctly regulate its cooperation with the sensor, this regulation can thus be performed just by screwing or fitting the spring 412 onto the projection 410 to a greater or lesser degree.

alignment: this spring 412 can operate perpendicularly to its axis by virtue of its elasticity and thereby makes it possible, throughout the useful life of the master cylinder 400, to correct any slight misalignments between the projection 410 of the plate 406, the housing of the master cylinder 400 through which the plunger 404 passes, and the inlet of the casing 402 containing the sensor.

The sensor (independently of its type) is welded or adhesively bonded to the casing 402.

The casing 402 is fastened to the master cylinder 400 by means of a spring clip 414 or a curved spring blade which is force-fitted in the direction of the arrow 420 and which encloses the casing 402 so as to rest on two rails 416 of the master cylinder 400.

Then, it is possible to slide the casing 402 (in the direction of the arrow 418) as far as a stop of the master cylinder 400 so as to place the casing optimally with the aim of respecting the alignment of the plate 406, plunger 404 and casing 402.

Thus, the casing 402 is immobilized parallel to the axis of the master cylinder 400 and perpendicularly to this axis.

The rail or rails 416 and the stop provide play-free axial positioning of the casing of the master cylinder 400.

The present invention is open to many variants based on various parameters such as, for example and without limitation, the choice of the type of sensor 230, the choice of whether the circuit passing through the sensor 230 is closed or open according to the detection or nondetection of braking, and the positioning of the sensor 230 along the body of the master cylinder.

The invention claimed is:

1. Method of detecting braking of a vehicle provided with a master cylinder (202, 400) and with a primary piston (200) having a piston axis, characterized in that the method comprises providing a plunger (220, 305, 404) having a plunger axis, the plunger being arranged parallel to the primary piston (200) with the plunger axis spaced from the piston axis, the plunger being operable to reproduce movements of the primary piston (200), and a sensor (230, 300) which senses movement of the plunger (220, 305, 404), and sensing movement of the plunger to detect a braking operation, characterized in that providing includes securing the plunger (220, 305, 404) to the primary piston of the master cylinder (200) by a plate (210, 406) situated in a casing of a booster (250) associated with the master cylinder (202, 400), the plate extending radially from the primary piston, the plunger being secured to the plate spaced radially from the primary piston, and characterized in that providing includes securing the plunger (220, 305, 404) to the plate (210, 406) by a spring (412) having contiguous turns.

2. Method according to claim 1, characterized in that the method includes sliding the plunger (220, 305, 404) along a surface of a housing (222) of the master cylinder (202, 400) spaced radially from the primary piston (200).

3. Method according to claim 1, characterized in that sensing includes sensing movement of the plunger with a reed switch sensitive to a magnetic field which varies according to the movement of the plunger (220, 404).

4. Method according to claim 1, characterized in that sensing includes sensing movement of the plunger with a Hall effect sensor operable to detect a movement of the plunger (220, 404).

5. Method according to claim 1, characterized in that the plunger (220, 404) generates a magnetic field in its end close to the sensor (230), and in that sensing includes sensing movement of the plunger with a sensor sensitive to the magnetic field of the plunger.

6. Method according to claim 1, characterized in that the sensor (230, 300) comprises a movable control (310) of a switch (302), and in that sensing includes contacting the control (310) with the plunger (220, 305, 404) when the plunger (220, 305, 404) moves.

7. Method according to claim 1, characterized in that providing includes situating the sensor (230, 300) in a casing (232, 402) secured to the master cylinder (202, 400).

8. Method according to claim 7, characterized in that providing includes sealing the casing (232, 402) of the sensor (230, 300).

9. Method according to claim 7, characterized in that situating includes positioning the casing (402) with respect to the master cylinder (400) by means of at least one rail (415) of the master cylinder (400) and a stop on the rail (416), the rail (416) and the stop providing play-free axial positioning.

10. Method according to claim 9, characterized in that positioning includes fastening the casing (402) the rail (416) by means of a spring clip (414) enclosing the casing (402).

11. Method according to claim 1, characterized in that securing includes securing the plunger to the primary piston by a plastic plate.

12. Method according to claim 1, characterized in that in that providing includes securing the plunger (220, 305, 404) to the primary piston by a plate (210, 406) and securing the plunger (220, 305, 404) at one end to the plate (210, 406) in a cantilever arrangement.

13. Method of detecting braking of a vehicle provided with a master cylinder (202, 400) and with a primary piston (200), characterized in that the method comprises providing a plunger (220, 305, 404) arranged parallel to the primary piston (200) and operable to reproduce movements of the primary piston (200), and a sensor (230, 300) which senses movement of the plunger (220, 305, 404), and sensing movement of the plunger to detect a braking operation, and in that providing includes securing the plunger (220, 305, 404) to the primary piston by a plate (210, 406) and securing the plunger (220, 305, 404) to the plate (210, 406) by a spring (412).

14. Method according to claim 13, characterized in that the primary piston (200) has a piston axis, in that providing includes providing a plunger (220, 305, 404) having a plunger axis, the plunger being arranged parallel to the primary piston (200) with the plunger axis spaced from the piston axis.

15. Method according to claim 13, characterized in that the method includes sliding the plunger (220, 305, 404) along a surface of a housing (222) of the master cylinder (202, 400).

16. Method according to claim 13, characterized in that providing includes securing the plunger (220, 305, 404) to the primary piston of the master cylinder (200) by a plastic plate (210, 406) situated in a casing of a booster (250) associated with the master cylinder (202, 400), the plate extending radially from the primary piston, the plunger being secured to the plate radially of the primary piston.

17. Method according to claim 13, characterized in that sensing includes sensing movement of the plunger with a reed switch sensitive to a magnetic field which varies according to the movement of the plunger (220, 404).

18. Method according to claim 13, characterized in that sensing includes sensing movement of the plunger with a Hall effect sensor operable to detect a movement of the plunger (220, 404).

19. Method according to claim 13, characterized in that the plunger (220, 404) generates a magnetic field in its end close to the sensor (230), and in that sensing includes sensing movement of the plunger with a sensor sensitive to the magnetic field of the plunger.

20. Method according to claim 13, characterized in that securing includes securing the plunger (220, 305, 404) at one end to the plate (210, 406) in a cantilever arrangement.

* * * * *